United States Patent
Nguyen et al.

(10) Patent No.: US 12,542,474 B2
(45) Date of Patent: Feb. 3, 2026

(54) EDDY CURRENT MAGNETIC BRAKING DEVICE, BRAKED VEHICLE WHEEL AND AIRCRAFT LANDING GEAR EQUIPPED WITH SUCH A WHEEL

(71) Applicant: SAFRAN LANDING SYSTEMS, Velizy-Villacoublay (FR)

(72) Inventors: Duy-Minh Nguyen, Moissy-Cramayel (FR); Guillaume Durand, Moissy-Cramayel (FR); Graeme Klim, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 281 days.

(21) Appl. No.: 18/289,338

(22) PCT Filed: May 3, 2022

(86) PCT No.: PCT/EP2022/061842
§ 371 (c)(1),
(2) Date: Nov. 2, 2023

(87) PCT Pub. No.: WO2022/233865
PCT Pub. Date: Nov. 10, 2022

(65) Prior Publication Data
US 2024/0372451 A1    Nov. 7, 2024

(30) Foreign Application Priority Data
May 3, 2021   (FR) ........................................ 2104656

(51) Int. Cl.
*H02K 49/04*   (2006.01)
*B60B 27/00*   (2006.01)
(Continued)

(52) U.S. Cl.
CPC ....... *H02K 49/046* (2013.01); *B60B 27/0047* (2013.01); *B60T 8/1703* (2013.01);
(Continued)

(58) Field of Classification Search
CPC ........... B60B 27/0047; B60B 2900/111; B60B 2900/114; B60T 8/1703; B64C 25/44
(Continued)

(56) References Cited

U.S. PATENT DOCUMENTS

| | | | |
|---|---|---|---|
| 2007/0000741 A1 | | 1/2007 | Pribonic et al. |
| 2012/0063631 A1* | | 3/2012 | Choi ................... G01N 29/2412 |
| | | | 381/396 |

(Continued)

FOREIGN PATENT DOCUMENTS

| | | | |
|---|---|---|---|
| CN | 105591523 A | 5/2016 | |
| CN | 106081148 A | 11/2016 | |

(Continued)

OTHER PUBLICATIONS

"Eddy current", Wikipedia, Mar. 8, 2018, Retrieved from the Internet: file:///C:/Users/dw53325/AppData/Local/Temp/Eddy_current.pdf, [retrieved on Apr. 12, 2018], XP055466757.

(Continued)

*Primary Examiner* — Rashad H Johnson
(74) *Attorney, Agent, or Firm* — Sughrue Mion, PLLC

(57) ABSTRACT

An eddy current magnetic braking device includes two outer elements surrounding a central element in relative movement with respect to the two outer elements, the central element being made of an electrically conductive material, the two outer elements having first faces facing opposite second faces of the central element and each of the two outer elements including plural magnets for emitting, via the first faces, a magnetic flow that generates in the central element eddy currents when the two outer elements are in relative (Continued)

movement. The plural magnets are arranged in such a way that the two outer elements attract each other. The central element has a thickness such that a skin effect is generated from each face of the central element over more than half the thickness of the central element over at least a range of possible relative speeds of the central element relative to the two outer elements.

14 Claims, 4 Drawing Sheets

(51) Int. Cl.
  *B60T 8/17* (2006.01)
  *B64C 25/44* (2006.01)
(52) U.S. Cl.
  CPC ......... *B64C 25/44* (2013.01); *B60B 2900/111* (2013.01); *B60B 2900/114* (2013.01)
(58) Field of Classification Search
  USPC .......................................................... 310/93
  See application file for complete search history.

(56) References Cited

U.S. PATENT DOCUMENTS

| | | | |
|---|---|---|---|
| 2020/0300310 A1 | 9/2020 | Kostic | |
| 2023/0176015 A1* | 6/2023 | Fadhel | ............... G01C 19/5712 |
| | | | 73/579 |
| 2024/0372451 A1* | 11/2024 | Nguyen | ................ B60T 13/748 |

FOREIGN PATENT DOCUMENTS

| | | |
|---|---|---|
| CN | 111900855 A | 11/2020 |
| EP | 3 309 944 A1 | 4/2018 |
| FR | 2 953 196 A1 | 6/2011 |
| WO | 2014/029962 A1 | 2/2014 |

OTHER PUBLICATIONS

International Search Report for PCT/EP2022/061842 dated Jul. 1, 2022.

* cited by examiner

EDDY CURRENT MAGNETIC BRAKING DEVICE, BRAKED VEHICLE WHEEL AND AIRCRAFT LANDING GEAR EQUIPPED WITH SUCH A WHEEL

CROSS REFERENCE TO RELATED APPLICATIONS

This application is a National Stage of International Application No. PCT/EP2022/061842 filed May 3, 2022, claiming priority based on French Patent Application No. 2104656 filed May 3, 2021, the contents of each of which being herein incorporated by reference herein in their entireties.

The present invention relates to the field of the braking of vehicle wheels, such as aircraft wheels.

BACKGROUND OF THE INVENTION

An aircraft wheel generally comprises a rim connected by a wall to a hub mounted to rotate on a wheel support shaft (axle or spindle).

Friction braking devices are known, comprising a brake disc stack which is housed in a space extending between the rim and the hub and which comprises alternating rotor discs rotatably linked with the wheel and stator discs, stationary with respect to the wheel support. The braking device also comprises hydraulic or electromechanical actuators mounted on an actuator carrier and arranged to apply a controlled braking force on the stack of discs, so as to block the rotation of the wheel.

It has been proposed, in particular in document FR-A2953196, to equip such braked wheels with an electromagnetic auxiliary brake ensuring an energy dissipation by means other than mechanical friction.

Eddy current magnetic braking devices are further known, used for the braking of vehicle wheels, and more specifically, aircraft wheels. Document WO-A-2014/029962 describes such a device comprising a rotor which is provided with one or more magnets, and which is mounted opposite an electromagnetic stator.

Document US-A-20200300310 itself also describes an eddy current magnetic braking device.

Generally, the performance of an eddy current magnetic braking device depends on the power of the magnets used and on their dimensions. The braking device is therefore relatively heavy and bulky when the maximum braking power required is significant. Such is the case, for example, of a use on an aeroplane, even though the mass and the bulk are severe constraints for this use.

Aim of the Invention

The invention aims, in particular, to propose an eddy current magnetic braking device, at least partially overcoming the abovementioned disadvantages.

SUMMARY OF THE INVENTION

To this end, according to the invention, an eddy current magnetic braking device is provided, comprising two external elements surrounding a central element in relative movement with respect to the external elements, the external elements having first faces facing second opposite faces of the central element and each carrying a plurality of magnets capable of emitting via the first faces a magnetic flow generating in the central element, made of electrically conductive material, eddy currents when the elements are in relative movement, the magnets being arranged in such a way that the external elements attract each other.

This arrangement makes it possible to optimize and concentrate the magnetic flow and therefore to generate a surplus of eddy current, thus providing a relatively large braking torque greater than that which would be obtained with two assemblies consisting of a stationary element and an movable element. With a suitable thickness of the central element, a "superposition of skin effects" can be obtained. This is obtained with a thickness of the central element which is sufficiently low while satisfying the thermal and mechanical stresses.

The invention also relates to a braked wheel equipped with such a device and a landing gear equipped with such a wheel.

Other features and advantages of the invention will emerge upon reading the following description of particular and non-limiting embodiments of the invention.

BRIEF DESCRIPTION OF THE DRAWING

Reference will be made to the accompanying drawings, among which.

DETAILED DESCRIPTION OF THE INVENTION

Figure 1:
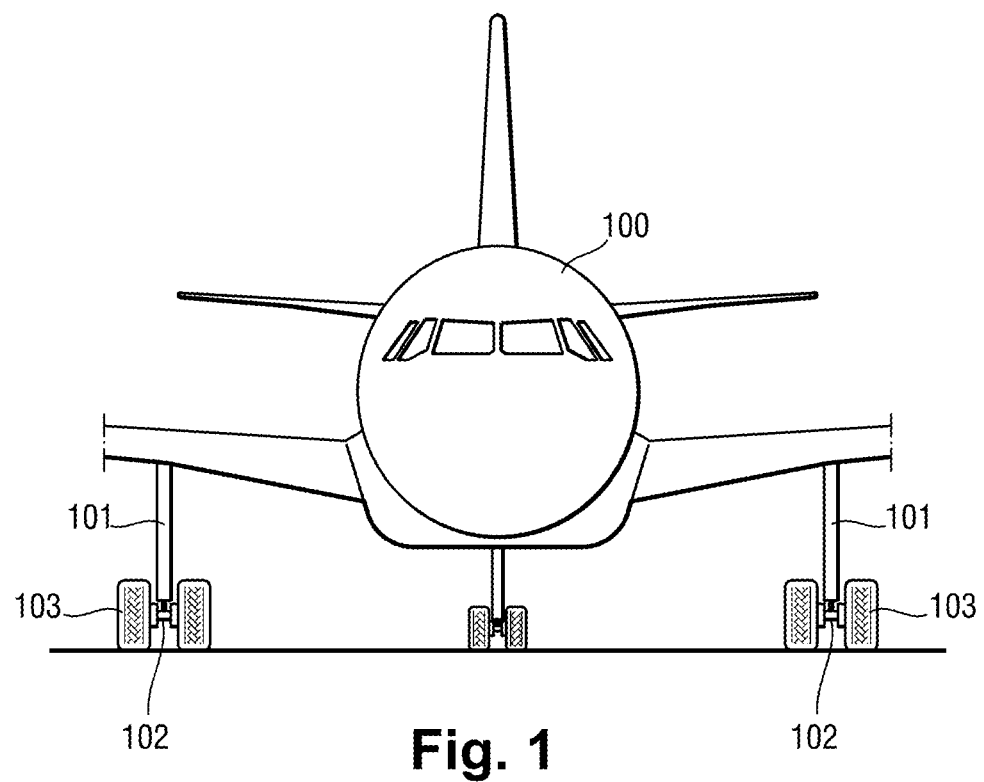
FIG. 1 is a partial schematic view of an aircraft equipped with a landing gear according to the invention.
Figure 2:
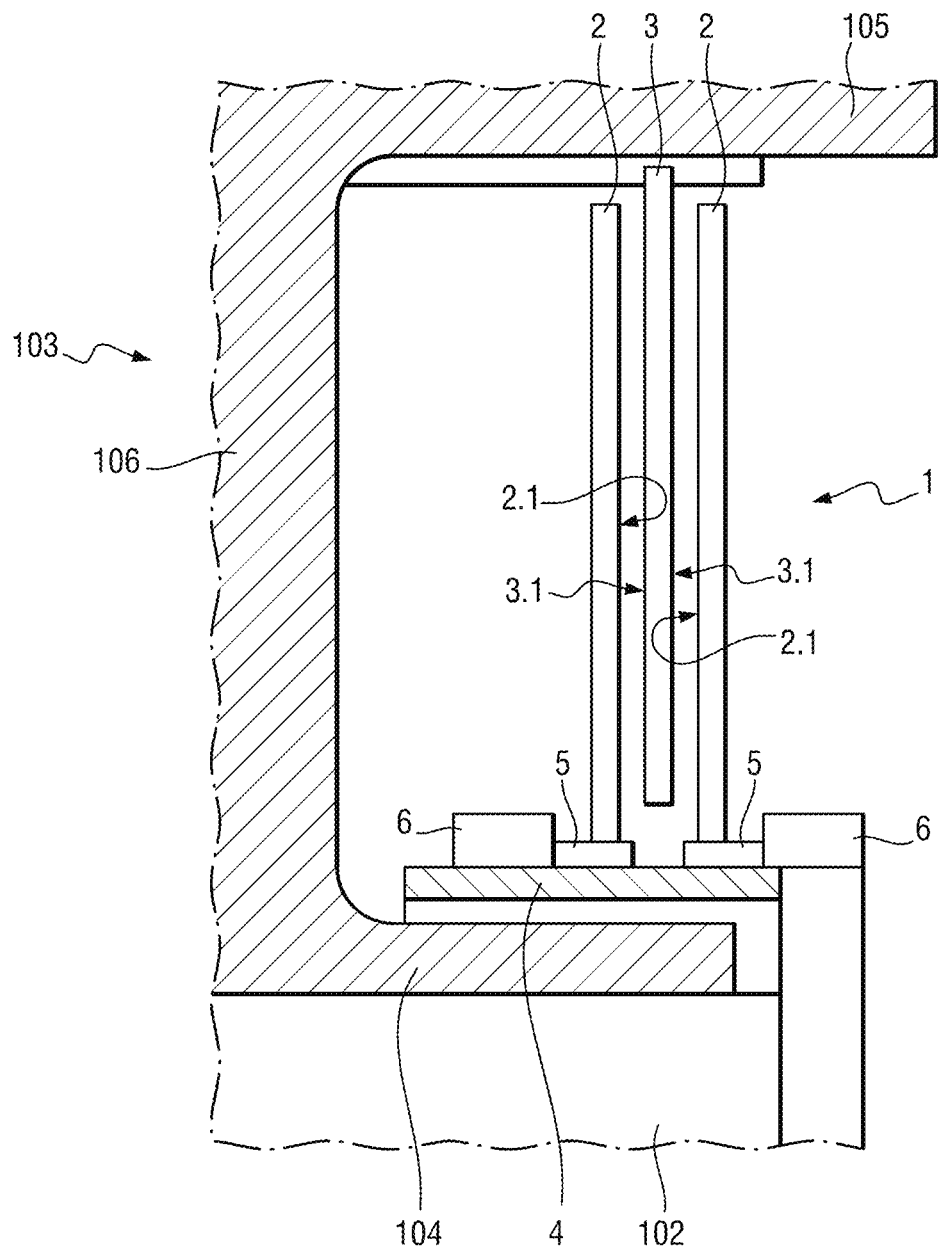
FIG. 2 is a partial schematic view of a wheel according to the invention

In reference to FIGS. 1 to 2, the braking system according to the invention is carried by an aircraft 100 comprising landing gears 101. Each landing gear 101 comprises a strut having an end provided with two coaxial shafts 102 on each of which a wheel 103 is mounted to pivot. Each wheel 103 comprises, in a manner known per se, a hub 104 mounted to pivot on the shaft 102 and a rim 105 connected to the hub 104 by a wall 106.

According to the invention, the wheels 103 are equipped with a magnetic braking device, generally referenced as 1.

The magnetic braking device 1 comprises stationary elements, or stators 2, and movable elements, or rotors 3.

More specifically in this case, the stators 2 and the rotors 3 are disc-shaped, coaxial to the wheel 103, therefore having colinear central axes. The stators 2 and the rotors 3 are arranged in threes, only one of which is represented in this case: each rotor 3 is disposed between two stators 2, each having a main face 2.1 extending opposite a main face 3.1 of the rotor 3. The faces 2.1, 3.1 are parallel to one another.

The stators 2 are rotatably linked to the shaft 102 or to the strut of the landing gear 101, in this case by way of a twisting tube 4, while the rotors 3 are rotatably linked to the wheel 103, in this case to the rim 105 of the wheel 103. Thus, in each three, each rotor 3 rotates on itself about its central axis with respect to the stators 2 which surround it: during this movement of the rotor 3 in a circumferential direction, the main faces 3.1 remain opposite the main faces 2.1 and parallel to these.

Each of the stators 2 is mounted on a slider 5 sliding (without rotation) over the twisting tube 4 to be movable in an axial direction of the twisting tube 4 between a first position, wherein the rotor 3 and the stator 2 are moved closer to one another and have their main faces 3.1, 2.1 separated by a predetermined first air gap and a second position, wherein the rotor 3 and the stator 2 are spaced apart from one another and have their main faces 3.1, 2.1 separated by a predetermined second air gap greater than the predetermined first air gap. At least one electromechanical actuator 6, controllable by the pilot of the aeroplane in a manner known per se, moves the slider 5 between the two abovementioned positions. An axial abutment is provided, of the bearing abutment or needle abutment type, interposed between the rotors 3 and the stators 2 (or between the parts linked to these) to ensure that the stators 2 cannot be moved closer to the rotors 3 beyond the first air gap.

The rotors 3 are made of copper or of any other electrically conductive material.

Figure 3:
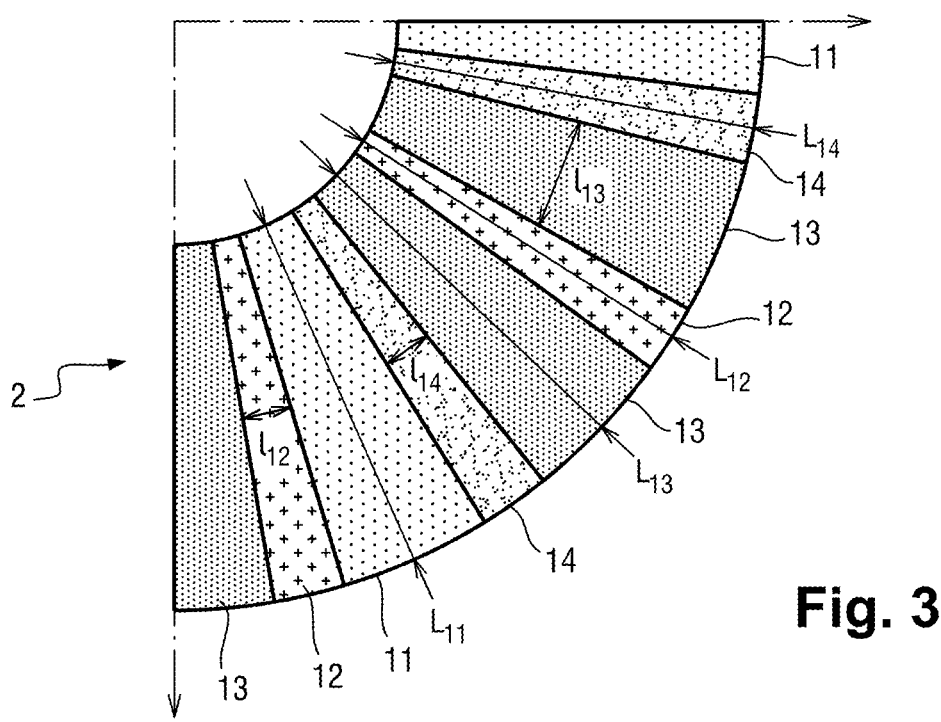
FIG. 3 is a partial schematic view of a stator of a braking device in a first embodiment of the invention.
Figure 4:
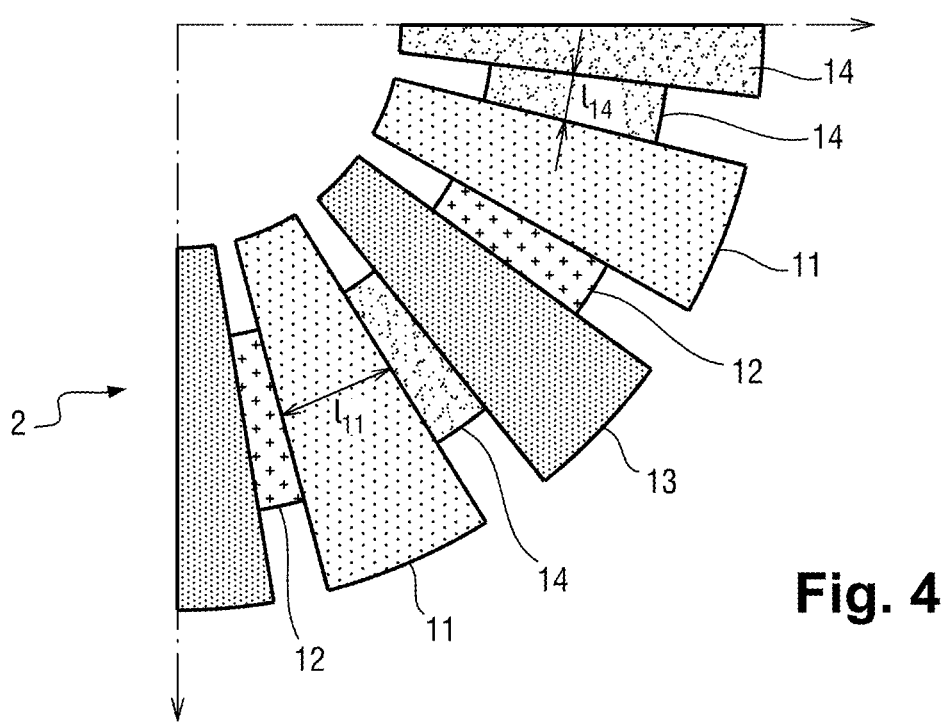
FIG. 4 is a partial schematic view of a stator of a braking device in a second embodiment of the invention.

In reference to FIGS. 3 and 4 also, each stator 2 comprises a plurality of magnets capable of generating eddy currents in the rotor 3 when the stator 2 is in the first position and that the rotor 3 pivots facing the stator 2. There are, for example 16 magnets, in this case, rare earth-based, and are preferably fixed to a magnetic steel support, even to a non-magnetic support.

The plurality of magnets comprises first magnets 11, 13 that have a first magnetisation vector substantially perpendicular to the main face 2.1 and being separated in pairs by a second magnet 12, 14 that has a second magnetisation vector substantially perpendicular to the first magnetisation vectors of the two first magnets 11, 13 between which the second magnet 12, 14 is located. It should be reminded that the magnetization vector indicates the direction of the magnetic field generated by a magnet and extends into the magnet from the South pole to the North pole. More specifically, the magnets 11, 12, 13, 14 have angular sector shapes, and have a length L measured in a radial direction of the stator 2 and an average width 1 measured in a locally tangential direction of the discs (i.e. perpendicularly to the direction of the length L), at half said length L. The lengths L and widths 1 are measured in directions locally parallel to the opposite surfaces (the main faces 2.1, 3.1).

The magnets 11, 12, 13, 14 are arranged according to a Halbach pattern, alternating in the circumferential direction of the stator 2 as follows: a magnet 11, a magnet 12, a magnet 13, a magnet 14, a magnet 11, a magnet 12, a magnet 13, a magnet 14 and so on . . . . In this case:

- each magnet 11 has its magnetisation vector which exits from the main face 2.1 (its North pole opens onto the main face 2.1),
- each magnet 12 has its magnetisation vector which extends from the neighbouring magnet 11 to the neighbouring magnet 13,
- each magnet 13 has its magnetisation vector which returns into the main face 2.1 (its South pole opens onto the main face 2.1),
- each magnet 14 has its magnetisation vector which extends from the neighbouring magnet 11 to the neighbouring magnet 13.

It is understood that the magnets 12, 14 disposed on each side of one same magnet 11 have their magnetisation vector in opposite directions.

In each three, each magnet 11 of one of the two stators 2 faces a magnet 13 of the other of the two stators 2, and vice versa, so that all the magnets 11 face magnets 13 and attract each other through the rotor 3, which improves performance.

According to an advantageous embodiment of the invention, the magnets 11, 12, 13, 14 have widths $1_{11}$, $1_{12}$, $1_{13}$, $1_{14}$ such that the first magnets 11, 13 are spaced apart in pairs by a first distance (equal to the width $1_{12}$, $1_{14}$) less than a second distance (equal to the width $1_{11}$, $1_{13}$) separating the second magnets 12, 14 in pairs. The best results are obtained, when the width $1_{12}$, $1_{14}$ of the second magnets 12, 14 is around 70% those—$1_{11}$, $1_{13}$—of the first magnets 11, 13.

With reference to FIG. 3, the lengths $L_{11}$, $L_{12}$, $L_{13}$, $L_{14}$ of the magnets 11, 12, 13, and 14 are identical to one another.

In reference to FIG. 4, the lengths $L_1$, $L_{13}$ of the magnets 11, 13 are identical to one another, and the lengths $L_{12}$, $L_{14}$ of the magnets 12, 14 are identical to one another. The lengths Ln, $L_{13}$ of the magnets 11, 13 are greater than the lengths $L_{12}$, $L_{14}$ of the magnets 12, 14. Preferably, the length $L_{12}$, $L_{14}$ of the second magnets 12, 14 is around 70% those of the first magnets 11, 13.

In the arrangement represented in FIG. 4, the magnets 12, 14 are positioned symmetrically over a circle passing through the geometric centre of the North poles of the magnets 11 and South poles of the magnets 13.

It is understood that in the two embodiments, the magnets 12, 14 occupy, on the main face 2.1, a surface smaller than that of the magnets 11, 13.

The arrangement of the magnets 11, 12, 13, 14 makes it possible to optimise and to concentrate the magnetic flow produced by the magnets 11, 13 by reducing the return path of the magnetic flow which passes through the magnets 12, 14, and not through the support, the mass of which can be reduced, since there is no need to ensure a conduction function of the magnetic flow.

The two embodiments above both allow an increase in the braking torque provided while limiting the weight and bulk of the device.

The first embodiment allows a higher braking torque than the second embodiment but on the other hand has a greater weight.

Each rotor 3 has a thickness such that a skin effect (otherwise called film effect or Kelvin effect) is generated from each face 3.1 of the rotor 3 over more than half the thickness of the rotor 3 at least over a range of possible relative speeds of the rotor 3 with respect to the stators 2. The eddy currents generated from the two faces 3.1 will then circulate in the central part of each rotor 3, which will increase the braking torque. A "superposition of skin effects" is thus obtained, the thickness of the rotor 3 being sufficiently small to obtain this effect while satisfying the thermal and mechanical stresses. In one example, this effect gives about 60% more performance.

It is understood that, by skin effect, the currents are mainly concentrated in a certain depth of the surface of the central element, called skin depth δ, determined by the formula:

$$\delta = \sqrt{\frac{\rho}{\pi f \mu_r \mu_0}}$$

in which ρ is the resistivity of the material, f is the rotation frequency, $\mu_r$ is the relative permeability (generally 1) and $\mu_0$ is the permeability constant, i.e. $4\pi \cdot 10^{-7}$.

The skin depth varies according to the electrical resistivity of the material and the speed of rotation (or electrical frequency) which are variable in our application. The skin increases when the resistivity increases (high temperature) and when the speed of rotation decreases. At the beginning of braking when the speed is high and the temperature is low (the resistivity is low), the skin is shallow. During braking, the speed decreases and the temperature increases (the resistivity increases), and the skin will become deeper.

The superposition of the skins on both sides of the central element increases the torque significantly, the thickness of the central element must be determined so as to have the superposition of the skins from the very beginning of braking. An attempt will be made to have a relatively small thickness, considering the mechanical and thermal stresses implemented in a braking device.

To have the superposition of the skins at a given speed, the skin X (the thickness in which the currents flow) must exceed half the thickness Y of the central element. Thus, X≥Y/2 or Y≤2X. The superposition that occurs in the middle of the central element is (2X−Y). By way of example, to have a superposition of skin effects from 1500 revolutions per minute, the thickness of the central element must be less than or equal to 9.4 mm. If for example a thickness of 8 mm is chosen, the skin effects will be superimposed over a thickness of 1.4 mm.

It is understood that to cause the braking, the electromechanical control actuators are controlled to bring the stators 2 into the first position, and that, to interrupt the braking, the electromechanical control actuators are controlled to bring the stators 2 into the second position, position in which the magnets do not make it possible to generate sufficient eddy currents in the rotors to cause the braking of the rotors. It will be noted that below a certain rotation speed of the rotors 3, the braking torque is insignificant, whatever the position of the stators. An additional brake must thus possibly be considered.

Naturally, the invention is not limited to the described embodiments, but covers any variant coming within the scope of the invention as defined by the claims.

In particular, the apparatus may be of a structure different from that described.

Magnets can be carried by the rotor instead of the stator, with two rotors surrounding a stator.

Figure 5:
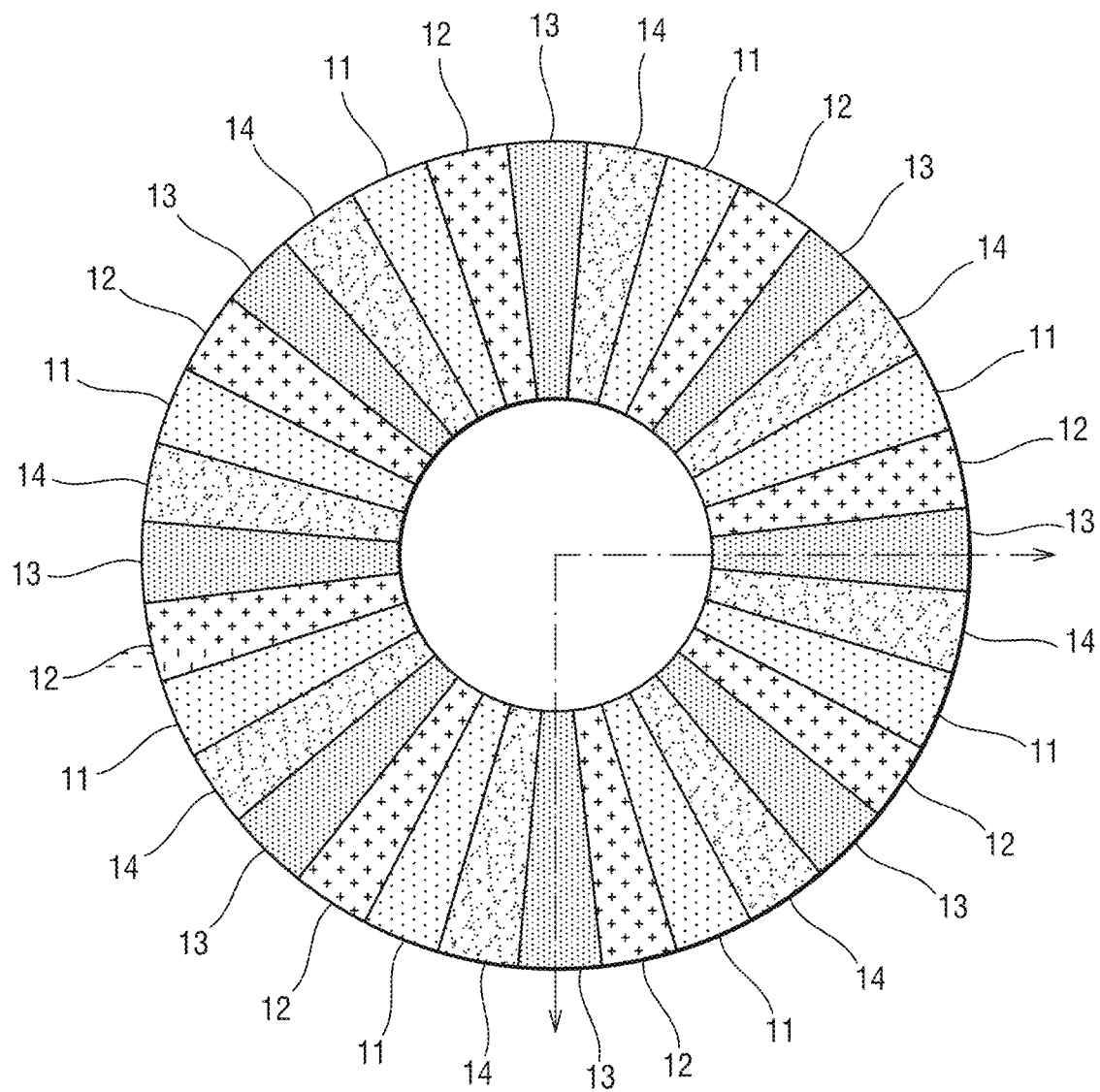
FIG. 5 is a partial schematic view of a stator of a braking device in a third embodiment of the invention.

The shape, the arrangement and the dimensions of the magnets can be different from those described. For example, and according to the third embodiment represented in FIG. 5, the magnets 11, 12, 13, 14 all have the same dimensions. Preferably, the first magnets 11, 13 will represent around 70% of the surface of the element which carries them, but this is not compulsory.

The number of rotors and/or the number of stators can be different from those mentioned.

Thus, although the rotor and the stator have been described in the form of parallel discs and opposite one another, the stator and the rotor can have other shapes. The device described has an axial flow, but the invention is applicable to a radial flow operation. Thus, the three may for example be arranged as an outer drum and an inner drum between which a central drum extends in such a way that the central drum has an outer surface facing an inner surface of the outer drum and an inner surface facing an outer surface of the inner drum. The magnets are carried by the outer surface of the internal drum or by the inner surface of the external drum.

The magnetic braking device according to the invention can be associated with a conventional friction braking device, which comprises friction members, for example a stack of carbon discs, and a plurality of electromechanical actuators carried by an actuator carrier. Each electromechanical actuator comprises an electric motor and a push-button capable of being moved by the electric motor to press the stack of discs. The electromechanical actuator is thus intended to produce a controlled braking force on the stack of discs. A mode for controlling the braking devices is, for example, known from document FR-A-2953196.

Alternatively, the magnets may be directly attached to the rotor discs or stator discs of the friction brake, or the magnets may be covered with a friction lining, so that the braking device provides magnetic braking to slow down the wheel when the discs are separated from each other by an adequate air gap and friction braking when the discs are applied against each other. There is therefore no longer any axial abutment between the disks in this embodiment.

It is possible to use, for the mechanical actuation of the magnetic braking device, an actuator acting on several stators sliding in the same direction to be brought closer to the adjacent rotor, rather than an actuator for each stator.

Other modes for actuating the magnetic brake can be envisaged: for example, electromagnetic by means of coils generating a magnetic field cancelling that of the permanent magnets, rotors and stators being axially stationary.

The invention can be used with any type of vehicle.

The invention claimed is:

1. An eddy current magnetic braking device, comprising: two outer elements surrounding a central element in relative movement with respect to the two outer elements, the central element being made of an electrically conductive material, the two outer elements having first faces facing opposite second faces of the central element and each of the two outer elements including a plurality of magnets for emitting, via the first faces, a magnetic flow that generates in the central element, eddy currents when the two outer elements are in relative movement,
wherein the plurality of magnets are arranged in such a way that the two outer elements attract each other, and
wherein the central element has a thickness such that a skin effect is generated from each face of the central element over more than half the thickness of the central element over at least a range of possible relative speeds of the central element-relative to the two outer elements.

2. The eddy current magnetic braking device according to claim 1, wherein the two outer members are stators and the central member is a rotor.

3. The eddy current magnetic braking device according to claim 2, wherein the two outer members and the central member are disc-shaped and have colinear central axes.

4. The eddy current magnetic braking device according to claim 1, wherein the plurality of magnets comprises first magnets and second magnets arranged alternately, the first magnets having a first magnetization vector substantially perpendicular to the facing surfaces and each of the second magnets having a second magnetization vector substantially perpendicular to the first magnetization vectors of two first magnets between which the second magnet is located; and the plurality of magnets have widths such that the first magnets are spaced apart in pairs by a first distance less than a second distance separating the second magnets in pairs.

5. The eddy current magnetic braking device according to claim 4, wherein the width of the second magnets is around 70% of the width of the first magnets.

6. The eddy current magnetic braking device according to claim 4, wherein the first magnets have a length measured along a direction perpendicular to their width and locally parallel to the facing surfaces, the length being greater than a length of the second magnets measured along a direction perpendicular to their width and locally parallel to the facing surfaces.

7. The eddy current magnetic braking device according to claim 6, wherein the width of the second magnets is around 70% of the width of the first magnets.

8. The eddy current magnetic braking device according to claim 4, wherein the first magnets represent around 70% of the surface of the one of the two outer elements which includes the first magnets.

9. The eddy current magnetic braking device according to claim 4, wherein the two outer elements have a disc shape and have colinear central axes, the central element having a main face opposite a main face of the two outer elements, thus forming the opposite surfaces and the central element pivoting on its central axis, each first vector extending perpendicularly to the main faces, and each second magnetization vector extending parallel to the main faces and to a direction locally tangent to the outer element provided with the plurality of magnets, the width of each magnet of the plurality of magnets being measured in a direction locally tangential to the outer element.

10. The eddy current magnetic braking device according to claim 9, wherein the plurality of magnets have an angular sector shape and the first magnets have a radial dimension greater than a radial dimension of the second magnets.

11. The eddy current magnetic braking device according to claim 1, wherein the plurality of magnets are disposed according to a Halbach pattern.

12. The eddy current magnetic braking device according to claim 1, wherein the plurality of magnets are included in the outer element.

13. A braked vehicle wheel comprising the eddy current magnetic braking device according to claim 1,
wherein the braked vehicle wheel comprises a rim, a wall or a hub to which the central element of the eddy current magnetic braking device is rotatably linked.

14. A landing gear comprising a strut having a shaft on an end thereof, the shaft supporting athe braked vehicle wheel according to claim 13,
wherein the braked vehicle wheel comprises the hub and the hub is mounted on the shaft, and
wherein the outer element of the eddy current magnetic braking device is rotatably linked to the strut.

\* \* \* \* \*